April 28, 1959  E. P. SYMONS  2,884,036
GRAIN CUTTERS WITH OPPOSED ECCENTRICALLY ROTATING BLADES
Filed Sept. 11, 1953  5 Sheets-Sheet 1

Inventor
Edgar P. Symons
by Parker & Carter
Attorneys

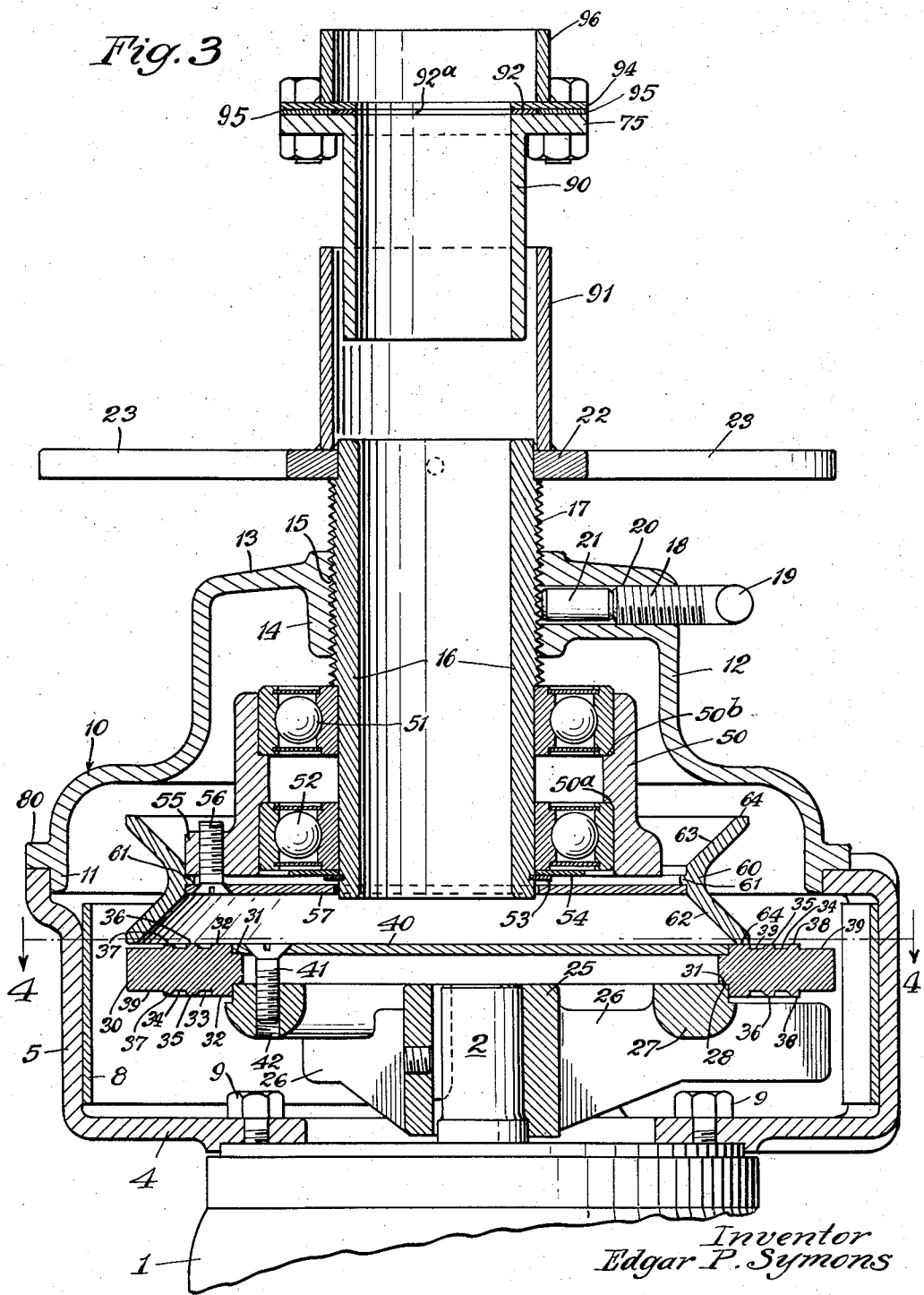

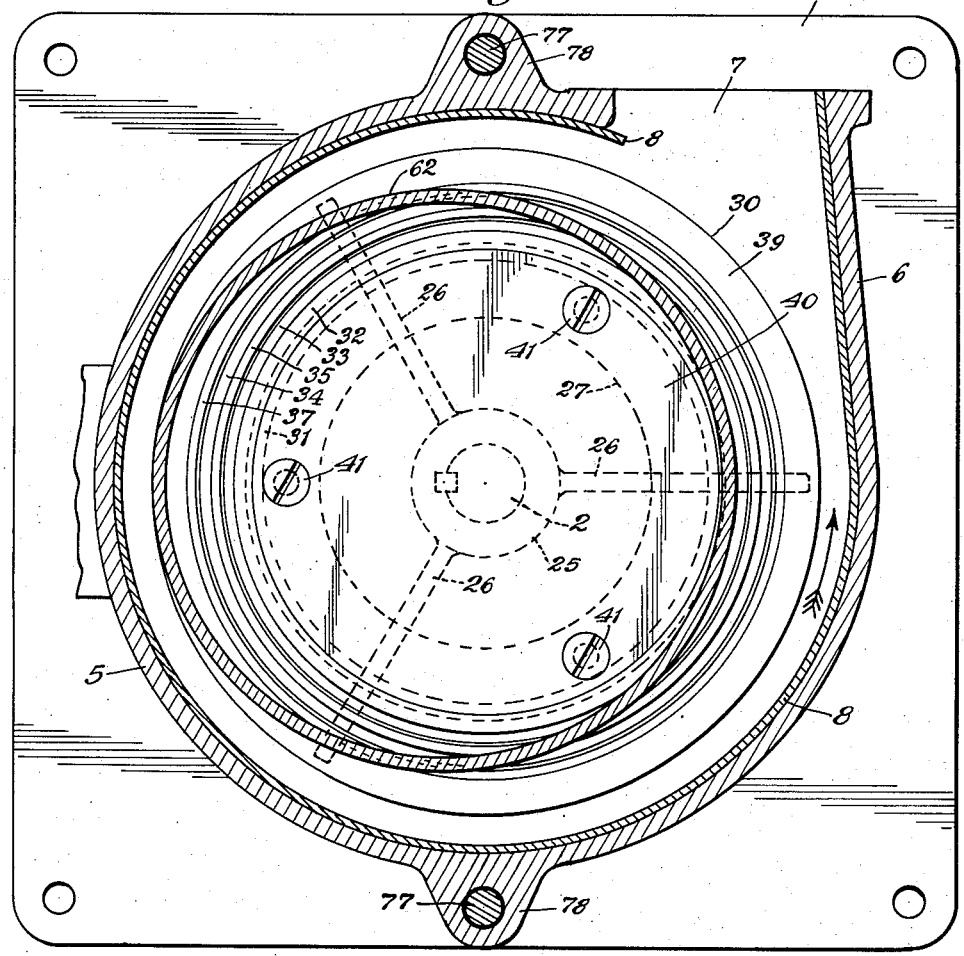
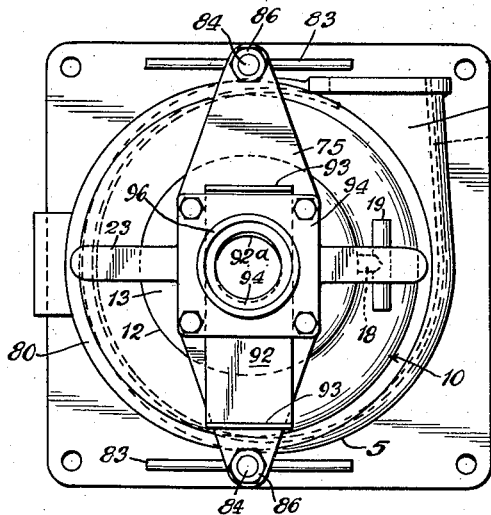

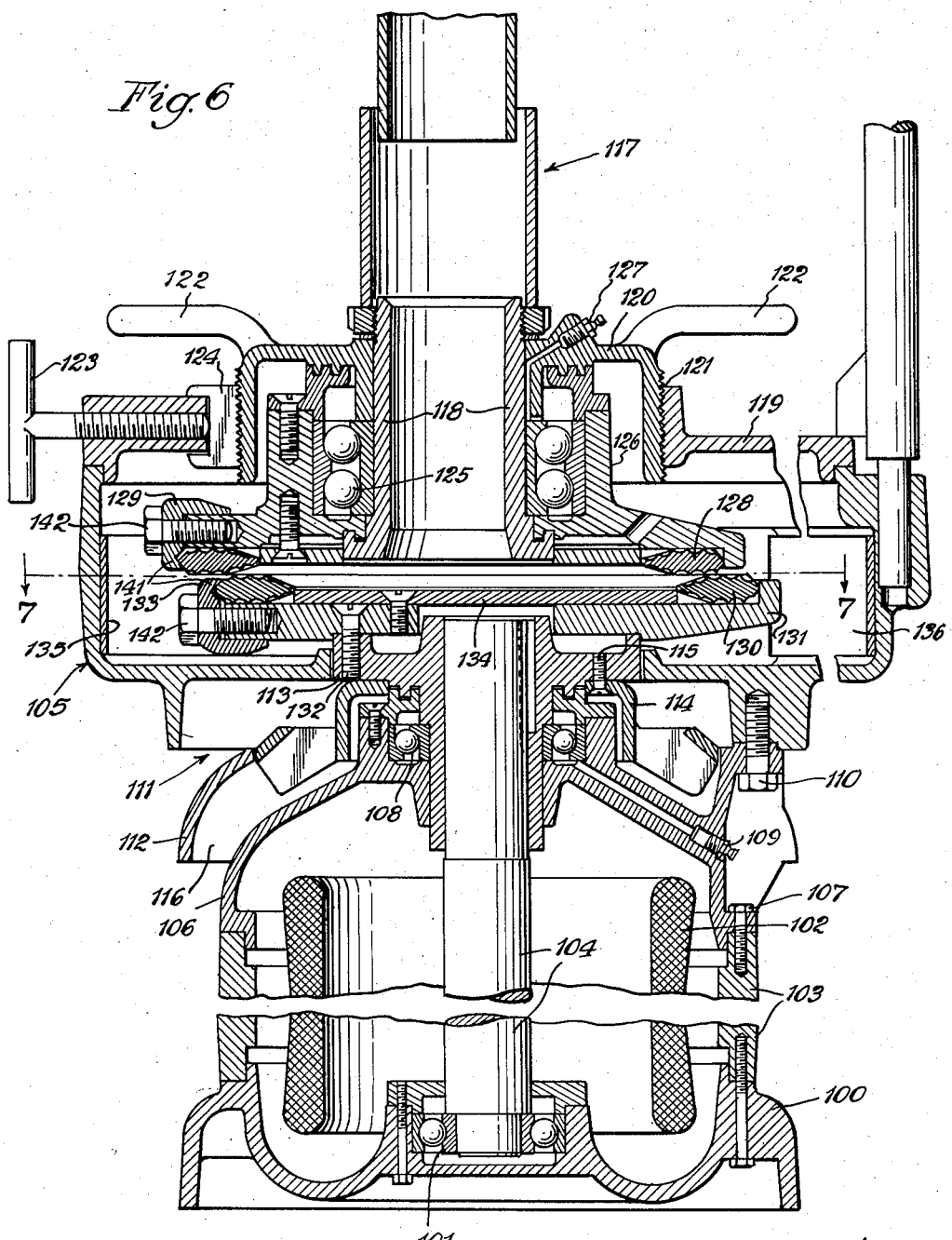

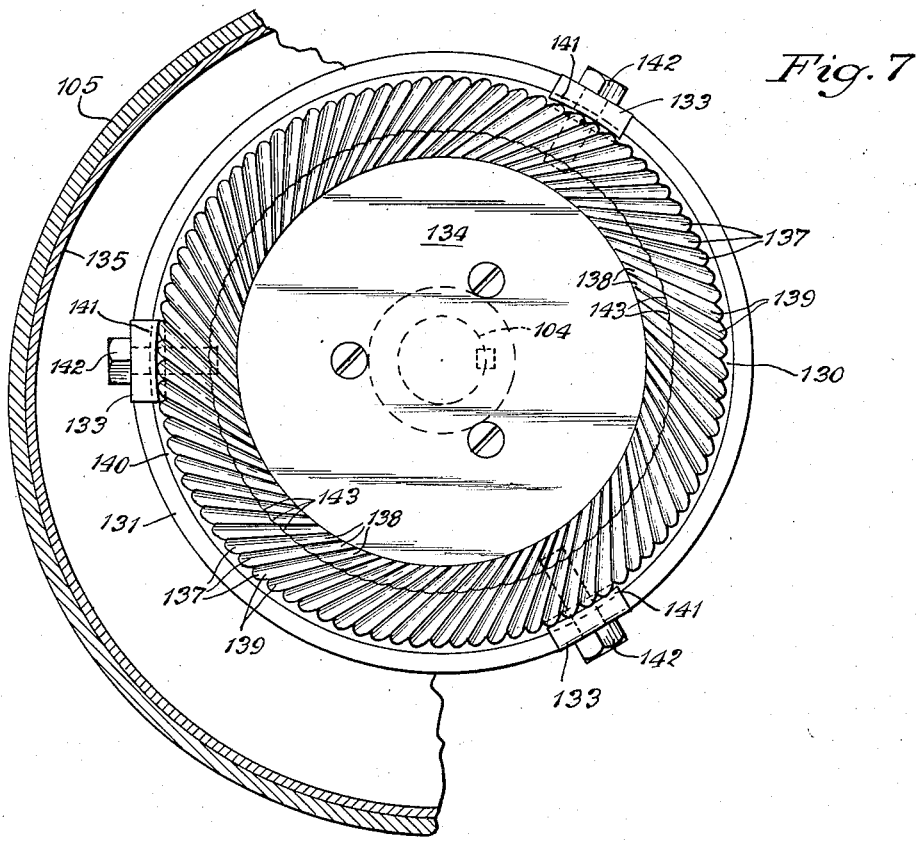
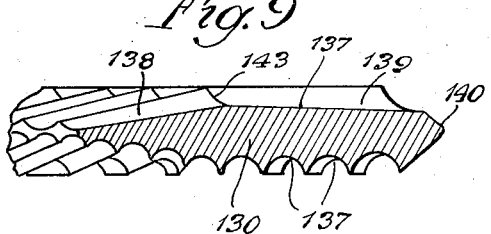
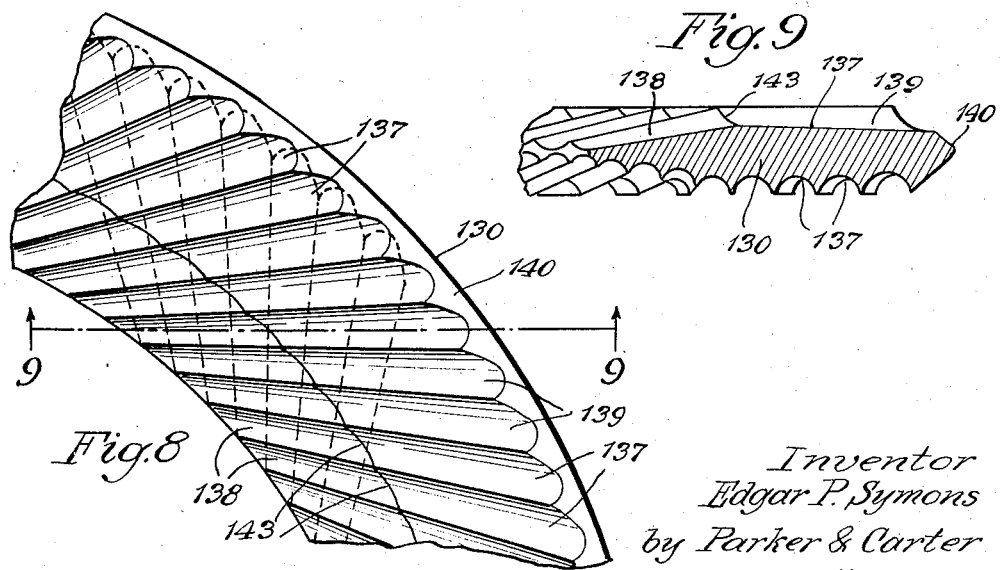

United States Patent Office 2,884,036
Patented Apr. 28, 1959

2,884,036

GRAIN CUTTERS WITH OPPOSED ECCENTRICALLY ROTATING BLADES

Edgar P. Symons, Hollywood, Calif., assignor to Symons Brothers Co., North Hollywood, Calif., a corporation of Delaware Application September 11, 1953, Serial No. 379,696

13 Claims. (Cl. 146—71.5)

My invention relates to an improvement in grain cutters and has for one purpose to provide a grain cutter which positively shears the grains with a minimum disturbance of the primary structure of the grain.

Another purpose is to provide a grain cutter which insures a minimum separation of husk from kernel and a minimum creation of fines.

Another purpose is to provide a grain cutter in which a scissors action is obtained by rotating opposed circular but eccentric blades in unison.

Another purpose is to provide a grain cutter in which a plurality of cutting edges is employed.

Another purpose is to provide improved removable cutting members.

Another purpose is to provide improved and removable cutting members which are reversible, for prolonged use.

Another purpose is to provide improved feeding means for grain cutters.

Another purpose is to provide a grain cutter with an improved adjusting means.

Another purpose is to provide a simplified structure in which a motor may be employed as a support.

Other purposes will appear from time to time in the course of the specification and claims.

I illustrate my invention more or less diagrammatically in the accompanying drawings wherein:

Figure 3 is a section, on an enlarged scale, on the line 3—3 of Figure 2;

Figure 4 is a section on the line 4—4 of Figure 3;

Figure 5 is a top plan view on substantially the same scale as Figures 1 and 2;

Figure 6 is a side view in section, similar to Figure 3, of a modified form of this invention;

Figure 7 is a sectional view along line 7—7 of Figure 6;

Figure 8 is a detailed enlarged view of the cutter element shown in Figure 7; and Figure 9 is a sectional view of the cutter element taken along line 9—9 of Figure 8.

Figure 1:
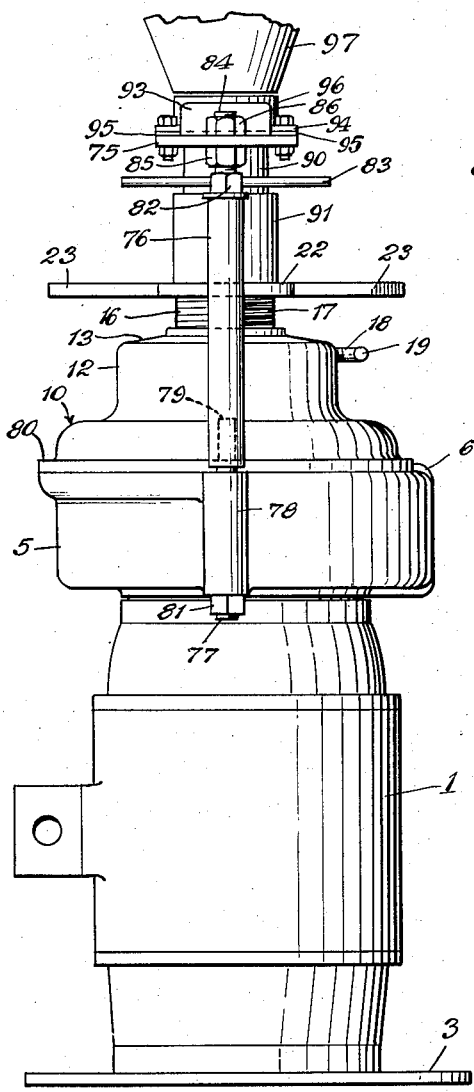
Figure 1 is a side elevation.

This is a continuation in part of my copending application, Serial No. 108,565, filed August 4, 1949, for "Grain Cutter With Opposed Eccentrically Rotating Blades," now abandoned.

Like parts are indicated by like symbols throughout the specification and drawings.

Referring to the drawings, 1 generally indicates a motor housing. It will be understood that within the motor housing is any suitable motor structure. However, I illustrate only the motor shaft 2, projecting from the upper end of the housing 1, as shown in Figure 3. The motor housing 1 may be secured to or positioned removably upon any suitable floor plate 3. Thus the motor housing 1 and the floor plate 3, taken together, constitute, in effect, a base and support for the below described feed or grain cutter.

Secured to the upper end of the motor housing is an apertured plate 4 having a circumferential spiral wall 5, herein shown as integral therewith, the wall 5 having a tangential extension 6 in Figure 4 formed and adapted to assist in defining an outlet or discharge passage 7. A liner 8 may be provided to protect the inner surface of the wall portions 5 and 6, the liner 8 being, if desired, removable and replaceable. The unit thus formed may be secured removably to the motor housing, for example, by any suitable bolts 9. 10 generally indicates a cover plate for the chamber thus formed. It is shown as provided with a centering flange 11 which extends within and seats in the top opening of the wall 5, 6. As shown, for example, in Figure 5, the top plate 10 is outwardly extended, as at 11a, to serve as the top wall of the discharge outlet 7.

The top plate 10 is shown as having an upward extension 12 terminating in an inwardly extending top wall 13 having a central hub 14 internally screw-threaded as at 15. Adjustably mounted within the hub 14 is the feed tube 16. It is outwardly screw-threaded as at 17 and may be adjusted by being rotated within the hub 14. It may be locked at any suitable position of adjustment by rotation of the locking screw 18 shown as provided with a hand-engaging handle 19. It is in screw-threaded relation with any suitable sleeve or aperture 20 in the top portion 13 of the cover plate, the bore extending clear through the inner surface of the hub 14. 21 is any suitable locking element, which may be a plug or piece of wood or other suitable material.

It will thus be understood that by rotation of the handle 19 unintended rotation of the feed tube 16 may be prevented. The tube may be rotated, for example, by the top ring 22 provided with diametrically opposed handles 23.

Secured to the motor shaft 2 is a hub 25, shown as provided with outwardly extending arms 26 which carry an outer ring 27. The ring 27 is shown as having, in radical cross-section, a rectangular corner 28. Seated on this corner 28 is a cutting ring 30 herein shown as having uniform upper and lower faces. Each face has an inner notch 31 and an inner annulus 32. The annulus 32 is surrounded by a circumferential gauging slot 33. Concentric therewith is an outer gauging slot 34. Between the two slots is a cutting ring 35 having its upper surface 36 in the plane of the surface 32. 37 is an outer cutting ring having its outer surface 38 in a like plane. 39 is a gauging surface which extends to the outer edge of the ring. It will be observed that I thus provide an inner annulus 32 and two outer cutting rings, all three members terminating in a common plane. Similarly, the surface 39 and the bottoms of the two gauging slots 33 and 34 also lie in a common plane. The ring 30 may be held in place, for example, by the locking and feeding plate 40 which extends into one of the notches 31, and which may be locked in position, for example, by suitable screws 41 which enter suitably threaded apertures 42 in the ring 27. It will be understood that the plate 40 is replaceable and reversible when its upper surface has become worn to an undesirable degree. Preferably, the surface of the ring 30, or, at least, of its edge portion, is continuous with or conforms to the surface of the annulus 32. Whereas I illustrate, at 30, a reversible ring, it will be understood that the reversible feature, while advantageous, is not necessary.

It will be noted that the axis of the feed tube 16 is centrifugally offset from the axis of rotation of the motor shaft 2, and thus of the lower cutter ring 30. Rotatable around the lower end of the feed tube 16 is the below described upper rotor. It is shown as including a supporting ring 50 spaced from the tube 16 by suitable ball bearing assemblies 51 and 52. The lower ball bearing assembly 52 is supported on the lower end of the tube 16, for example, by the snap ring or locking ring 53 and the ring or plate 54. The ring 50 is provided with a ledge or stop 50a which rests on the outer component or race of the ball bearing unit 52. It is provided with an upper stop 50b which receives and supports the outer element or race of the upper ball bearing unit 51.

The ring 50 is provided with outwardly extending ears or lugs 55 apertured to receive locking screws 56 which hold the generally plane surfaced ring 57 in position. Locked between the lugs 55 and the edge of the ring 57 is the inwardly extending central flange 61 of the upper cutting ring 60. The cutting ring 60 is shown as including generally conic upper and lower cutting elements 62 and 63. Each of these terminates in a cutting surface 64. As will be evident from Figure 3, a ring thus formed is reversible, and may be removed and reversed by releasing the screws 56 when the cover plate 10 and its associated parts are upwardly removed. Whereas a reversible ring is advantageous, it is not necessary. It will be understood, for example, from Figure 3, that the feed tube 16, and thus the plane of the cutting surface 64 of the lower conic cutting member 62, may be adjusted closely to approach the plane of the annulus 32 and of the cutting ridges of the lower cutting ring 30.

It will be understood that when material is fed down the tube 16 to the upper surface of the plate 40, such material will be centrifugally moved outwardly against the inner surface of the ring 62. It will thus be cammed downwardly against the lower cutting ring 30, and when the device is operated under normal feed conditions, centrifugal action is effective both to urge the feed downwardly against the upper surface of the ring 30, and to urge it against the inner surface 62 of the ring 60, with sufficient force to rotate the upper ring in unison with the lower. The upper ring takes substantially the speed of rotation of the lower, but, since the axes of the two rings are offset, as shown in Figure 3, the result is a cutting action. Since the common rotation of the two rings is accompanied by a substantially centrifugal, outward feed of the material, the particles are firmly thrust downwardly against the gauging surface of the upper face of the lower feed ring 30, and the result is an accurate gauging or sizing of the cut particles. The particles escape into the space surrounded by the liner 3, and, as the rotors rotate in the direction of the arrow of Figure 4, the cut material is discharged outwardly through the outlet 7. The arms 26, if desired, may be so formed as to act as fan blades, whereby a strong air current carries the cut particles outwardly through the discharge passage 7. Air is free to flow downwardly through the tube 16, and the cut particles, including whatever dust is formed, are drawn outwardly, there being little, if any, escape of dust upwardly through the tube 16.

Figure 2:
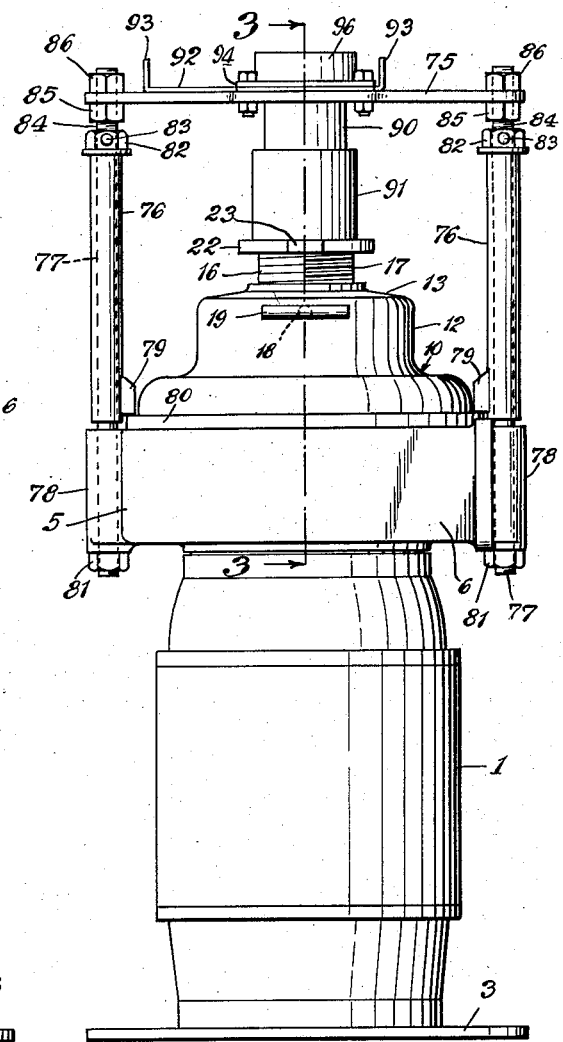
Figure 2 is an elevation at right angles to that of Figure 1.

I may provide any suitable means for feeding material into the top of the tube 16. I illustrate a top supporting member 75 which is shown as adjustably supported on a pair of supporting elements 76. These elements may be hollow throughout, or at the ends, and may, for example, receive securing bolts or threaded rods 77 shown as passing through lugs or projections 78 formed in the circumferential wall 5. The tubes 76 are shown as having inwardly extending lugs 79 which may thrust downwardly against the circumferential ledge 80 of the cover plate 10, as shown in Figure 2. The parts may be locked together by the bottom nuts 81 and the top nuts 82. The top nuts 82 are shown as having handle rods 83 suitably secured to them. 84, 84 indicate upper extensions or parts of the bolts or rods 77. As a matter of convenience, a single bolt or rod may be employed, either threaded from end to end or having substantially threaded portions at its upper and lower ends. On the upper threaded portions or extensions 84 the cross-piece 75 is adjustably mounted. It may be adjusted, for example, by rotation of the nuts 85 and 86.

Carried on the cross-piece 75 is the top feeding sleeve 90 which extends downwardly into an upper tube 91 which is shown as welded to the ring or circumferential member 22. It will be noted that, whereas the parts 90 and 91 are in telescopic relationship, there is an air-admitting clearance between them, whereby the flow of air downwardly, with the fed material, to and through the cutting zone, is maintained. Positioned on the top of the cross-piece 75 I illustrate a feed controlling slide 92 having end limit members or handles 93. It may slide in any suitable guiding structure. I illustrate it as sliding between the upper surface of the cross-piece 75 and the lower surface of a top plate 94. 95 indicates any suitable spacers.

Positioned on the top plate 94 is a feed receiving sleeve 96 into which the lower end of any suitable hopper 97 may extend, or with which the lower end of any suitable hopper may be aligned. It will be understood that the slide 92 has a feed-passing aperture 92a, as shown in Figure 5. Thus, by variation of the position of the slide 92, a fully open aperture may be provided, or the aperture may be completely closed, or any intermediate rate of feed may be maintained.

In Figures 6 through 9, I have shown a modified form of my invention and, basically, the details of the exterior housing of the cutter are much the same.

In Figure 6, the cutter has a base 100 with a suitable bearing unit 101 centrally disposed in it. A motor 102 is mounted on the base and is surrounded by a suitable housing 103. The motor has a rotor 104 generally centrally disposed therein and projecting upwardly into a cutter housing, indicated generally at 105. The upper end of the motor housing is closed by a top member 106 which is secured to the housing by a plurality of suitable bolts 107. A bearing unit 108 is carried by the top member 106 and a suitable grease connection 109 is provided for it.

The cutter housing 105 is removably connected to the top member of the motor housing by a plurality of suitable bolts 110. The housing is designed to provide a plurality of openings 111 suitably disposed around it, and a downwardly disposed skirt or shield 112 is provided on the top member of the motor housing. The rotor has a hub 113 keyed to its upper end and adapted to rotate therewith. A fan element 114 having a plurality of outwardly disposed blades is connected to the hub by screws 115 or the like and adapted to rotate with the rotor. The blades are designed to expel air downwardly in the passages 116 formed between the shield 112 and the top of the motor housing. Air will be drawn in through the openings 111 and forced downwardly by the blades when the unit is in operation to thus effectively curtain the motor housing with a moving air current for cooling purposes.

The feed tube and its supporting structure, indicated generally at 117, is substantially the same as in the previous modification and will not be alluded to in detail. The main feed tube 118 is adjustably mounted in a cover plate 119 which has a top element 120 threadedly connected to the top plate at 121. The top element has outwardly disposed handle elements 122 so that it can be rotated and adjusted within the cover. The cover carries one or more rotatable handled screws 123 which actuate a plug 124, made of plastic or the like, into engagement with the threaded portion of the top member, thus preventing unauthorized rotation of the top member.

A suitable bearing assembly 125 is carried by the tube 118, the outer race of the bearing assembly engaging a ring member 126. The bearing assembly is lubricated through a suitable grease connection 127. The ring member 126 has an annular upper cutter element, shown generally at 128, removably connected and supported on its lower surface through a plurality of clamping members 129, to be explained in detail hereinbelow.

Coacting with the upper cutter element is an annular lower cutter element 130 which is carried by a plate 131 which is connected to the hub 113 through a suitable number of bolts 132. The lower cutter element 130 is removably secured to the plate 131 by a plurality of clamping members 133 which are similar to the other clamping members 129.

As in the previous modification, the cutter elements are annular or ring-shaped and a feed plate 134 is secured to the plate 131 and positioned in the central opening of the lower cutter element 130. Feed material being fed down through the tube 118 will fall on the plate 134 and be thrown outwardly centrifugally by the rotary motion of the rotor.

It will be understood that a suitable replaceable liner 135 may be used in the cutter housing as in the previous modification, and the housing has a discharge opening, indicated generally at 136.

The upper and lower cutter elements are substantially identical and one of them is shown in detail in Figures 7, 8 and 9. A working surface is provided on both sides of the cutter element so that it is reversible. The surface is composed of a plurality of grooves 137 which are skewed with respect to the axis of the cutter element. The working surface is divided primarily into two zones, each being annular and concentrically disposed. The inner zone, indicated at 138, is inclined slightly to the plane of the cutter element, and the cutting zone 139 is substantially parallel to the plane of the cutter element and perpendicular to its axis. The outer peripheral edge 140 is beveled to provide a locking surface for the clamping elements. Each of the clamping elements has a camming lug 141 which overlies the outer locking surface of the cutter element, and a suitable actuating means, such as the bolts 142, are provided on each of the clamping members so that they can be individually moved during the locking operation. Thus, each of the cutter elements can be adjusted slightly on its supporting mechanism.

In Figure 8 I have shown an enlarged detail view of one of the cutter elements, and attention is particularly directed to the angular or skewed disposition of the grooves or channels that form the working or cutting face. Assuming that Figure 8 represents the lower cutting element 130, the bottom face of the upper cutter element would have its channels or grooves disposed approximately at right angles to those shown. Thus, when the material is introduced between the cutter elements and, due to frictional contact, the upper cutter element rotates with the lower cutter element, the cutting edges and working faces of the upper and lower cutter elements will be moving across one another so as to acquire a very effective cutting and sizing action.

The cutting zone 139 and loading zone 138 are separated by a breaking line 143. The radial width of the cutting zone is approximately equal to the eccentric distance between the upper and lower cutting elements. Thus, in the areas of maximum overlap, the breaking line 143 of the lower cutter element will be directly under the outer edge of the cutting zone of the upper cutting element. On the opposite side of the cutter rings, the breaking line of the upper cutter element will overlie the outer edge of the cutting zone of the lower cutting element. In between these two extreme positions of the overlap, the working zones of each of the cutter elements will completely traverse each other as they move in opposite directions relative to one another.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

I provide a compact, efficient grain cutter in which the motor may, if desired, serve as the base. Whether the motor is used as a base, or some other base is employed, I provide a circumferential rotor housing within which rotates a rotor which includes the cutter ring. It will be understood that whereas I find it advantageous to have the axis of the rotor, if not vertical, at least upright. It will also be understood that, under some circumstances, the axes of the rotor may be inclined substantially from the perpendicular, or may be even horizontal similar to the arrangement of the unit in my prior U.S. Patent No. 2,589,307. However, the vertical arrangement is, in the main, preferable.

In the modification of Figures 1–5 inclusive, the inner or lower ring has a plurality of channels separated by crests. These crests lie in a plane generally perpendicular to the axis of the rotor. Exterior to the outermost crest is a zone of parallelism in which a preferably plane surface is spaced somewhat below the plane of the crests. The opposed rotary cutter may be generally conic, or, at least, flared, and terminates in a single cutting lip opposed to the part of the lower or inner cutting ring which carries the crests and, which includes the plane outer surface.

The parts are so proportioned that at all positions the lip of the upper or outer cutter ring overlies or opposes at least the plane outer portion of the lower ring. In other words, a gauging as well as a cutting relationship is maintained.

In the use of the device, the upper or outer ring at all times overlies and is opposed to a portion of the lower ring. As the single cutting lip gyrates in relation to the ridges or crests or channels of the lower ring, grain is cut or sheared by the resulting relative movement. The sheared grain is carried promptly outwardly of the cutting edge or lip. No particles escape cutting, since the cutting lip always overlies at least the outer plane portion of the lower or inner ring.

In Figure 3 on the left side, the grooved area of the cutting ring is inside the cutting edge of the lower conic cutting member in the loading position. Due to the eccentricity between the rotary elements, the conic cutting member moves inwardly and the cutting ring, with its grooved area, moves outwardly to the position shown on the right-hand side of Figure 3, this being the discharge station or position. Thus, the grain material is loaded when the cutting ring is inside the conic cutting member 62 and it sweeps outside to the discharge position and then moves inside again. The cutting ring loads, sweeps outwardly to cut or size the grain material to the discharge position, then moves inwardly to reload.

In the modification of Figures 6 through 9, the upper and lower cutting rings are substantially identical and each has an outer cutting zone separated from an inner loading zone by a break-off line. The radial width of the working or cutting zone is at least equal to the eccentricity between the rotary members and, therefore, when the lower cutting ring reaches the discharge station, the working zone will be extended beyond the outer edge of the upper ring. The particles in the working zone escape at the end of the stroke.

The grooves in each of the cutting rings are skewed with respect to the axis of the ring and the width of these grooves size the particles. Thus, the particles of grain will be broken to groove size and swept across the flat outer zone and completely discharged in a half revolution. It should be noted that the grooves on each side of the ring are oriented in opposite directions from each other. Consequently, the grooves on the bottom of the upper ring will sweep across the upwardly facing grooves on the lower ring and this can be termed a "pushing action."

In the left side of Figure 6, the cutting rings are in the loading position, and the upper ring is just beginning its inward movement over the lower ring, resulting in the breaking or cutting action. In the right side of Figure 6, the upper ring is substantially in its innermost position and the grain material held by the lower ring is now free to escape. From this position the upper ring moves outwardly until it returns to the position in the left-hand side of this figure in which the lower ring is reloaded. Thus, the cutting rings will load or trap the material, break it by cutting it to the size of the grooves in the working zone, and sweep it outwardly into the cutting chamber and to the discharge spout, all in one revolution of the cutting rings.

I claim:

1. In a sizing machine for cutting grain material and the like, a base, a generally upright motor mounted on the base, power means on the base attached to the lower end of the rotor for driving it, a housing with a first portion that encloses the power means and a second portion that defines a cutting chamber, the first portion having a top surface exposed to the ambient atmosphere, a pair of cutting elements opposed to each other and disposed in cutting relationship in the cutting chamber, one being mounted on the rotor and rotatable therewith, the other being mounted on the housing for rotation about an axis generally parallel but eccentric to the axis of the rotor, a discharge outlet for the cutting chamber, and means for maintaining a screen of cooling, cleaning air between the top surface of the first portion of the housing and the cutting chamber, which includes a circumferentially extending deflector positioned above and about the first portion of the housing and below the discharge outlet, and fan elements movable with the rotor and formed and adapted, in response to rotation of the rotor, to direct air through the deflector and downwardly about said first portion of the housing and thereby dissipate the heat generated by the power means and absorbed by the first portion of the housing.

2. In a sizing machine for cutting grain material and the like, a rotor with power means for rotating it, a housing surrounding the rotor and defining a cutting chamber, the rotor projecting into the chamber and having a feed-receiving member positioned in the chamber and adapted, in response to rotation of the rotor, to feed material delivered to it centrifugally toward its periphery, means projecting into the chamber for directing material to the feed-receiving member, a first cutting structure connected to the rotor so as to rotate therewith and having a generally annular cutting element, and a second cutting structure mounted for rotation in the housing about an axis generally parallel but eccentric to the axis of rotation of the rotor and having a generally annular cutting element, each of the cutting elements being detachably connected to its cutting structure by a plurality of locking elements, each of the locking elements having a cam locking lug that overlies the periphery of the cutting element.

3. The structure of claim 2 wherein the locking lugs are individually actuatable in a radial direction and removable from the cutting structures.

4. A cutting ring for grain cutters and the like including a ring body having a plurality of channels and intermediate cutting ridges disposed transversely to the edges of the ring, each of the channels having a conical loading portion generally inclined to the axis of the ring body, a cutting portion disposed radially outwardly from the loading portion and generally perpendicular to the axis of the ring, and a conic cam locking portion disposed radially from the loading and cutting portions.

5. In a grinder for grain and the like, a first rotor having a central impeller portion, means for feeding material to be ground to a central area of said impeller portion, means for rotating said rotor at a rate effective to cause substantial angular acceleration of the material as it moves outwardly across said impeller portion, a second rotor positioned and adapted to be frictionally driven by the rotation of the first rotor, said second rotor having a central portion spaced axially from the impeller portion of the first rotor and defining with it a space adapted to permit the outward passage of a predetermined flow of material, the two rotors being mounted for rotation about parallel eccentric axes, closely opposed circumferential cutting rings outwardly bounding the axially spaced inner portions of the two rotors, said cutting rings having cutting elements formed and adapted, in respect to rotation of the two rotors about their axes, to cut and discharge received material within a half revolution of the rotors, at least one of the cutting elements having a flat grooved surface with a plurality of gauging channels and intermediate cutting ridges, at least a portion of the upper surfaces of which lie in a common plane perpendicular to the axes of rotation of the rotor axes.

6. The structure of claim 5 wherein the cutting rings are narrower, radially, than the impeller portion.

7. The structure of claim 5 in which the eccentricity of the axes is of the order of the radial width of the cutter rings.

8. A cutting ring for grain cutters and the like including a ring body having a grooved conic surface adjacent its inner edge and a grooved flat surface, generally perpendicular to the ring axis, adjacent the outer edge, the grooves of said surfaces and their intermediate cutting ridges being disposed transversely of the edges of the ring, all of said grooves passing across the conic surface and continuing outwardly across the flat surface.

9. The structure of claim 8 characterized in that the grooves cross both the conic and flat surfaces at a substantial angle to a radial line.

10. In a grinder for grain and the like, a first rotor having a central impeller portion, means for feeding material to be ground to a central area of said impeller portion, means for rotating said rotor at a rate effective to cause substantial angular acceleration of the material as it moves outwardly across said impeller portion, a second rotor positioned and adapted to be frictionally driven by the rotation of the first rotor, said second rotor having a central portion spaced axially from the impeller portion of the first rotor and defining with it a space adapted to permit the outward passage of a predetermined flow of material, the two rotors being mounted for rotation about parallel eccentric and generally upright axes, closely opposed circumferential cutting rings outwardly bounding the axially spaced inner portions of the two rotors, said cutting rings having cutting elements formed and adapted, in respect to rotation of the two rotors about their axes, to cut and discharge received material within a half revolution of the rotors, at least the lower of said cutting rings having adjacent its outer edge a grooved flat surface generally perpendicular to the ring axis and having adjacent its inner edge a downwardly extending conic grooved surface.

11. The structure of claim 10 characterized in that all of the grooves extend across the conic surface and continue outwardly across the flat surface.

12. The structure of claim 10 characterized in that the grooves cross both the conic and the flat surface at a substantial angle to a radial line.

13. A cutting ring for grain cutters and the like including a ring body having, adjacent its outer edge, a grooved flat surface generally perpendicular to the ring axis and having adjacent its inner edge a downwardly extending conic grooved surface, the ring being thicker, along its axis, in the area of the grooved flat surface than in the area of the grooved conic surface, the grooved conic part of the ring lying between planes defined by the opposite faces of the flat-surfaced part of the ring, all of the grooves extending across the conic surface and continuing outwardly across the flat surface.

References Cited in the file of this patent

UNITED STATES PATENTS

| 29,010 | Ruof et al. | July 3, 1860 |
| 315,143 | Hudson et al. | Apr. 7, 1885 |

(Other references on following page)

UNITED STATES PATENTS

| | | | |
|---|---|---|---|
| 326,264 | Browne | Sept. 15, | 1885 |
| 934,457 | McLaughlin | Sept. 21, | 1909 |
| 1,057,427 | Higbee | Apr. 1, | 1913 |
| 1,127,101 | Smith et al. | Feb. 2, | 1915 |
| 1,652,134 | Thompson | Dec. 6, | 1927 |
| 1,670,714 | Craig | May 22, | 1928 |
| 2,121,275 | Zober | June 21, | 1938 |
| 2,214,707 | Markley | Sept. 10, | 1940 |
| 2,522,643 | Schuhmann et al. | Sept. 19, | 1950 |
| 2,589,307 | Symons | Mar. 18, | 1952 |
| 2,689,593 | Symons | Sept. 21, | 1954 |

FOREIGN PATENTS

| | | | |
|---|---|---|---|
| 503,409 | Great Britain | Apr. 3, | 1939 |

UNITED STATES PATENT OFFICE

CERTIFICATE OF CORRECTION

Patent No. 2,884,036　　　　　　　　　　　　　　　April 28, 1959

Edgar P. Symons

It is hereby certified that error appears in the printed specification of the above numbered patent requiring correction and that the said Letters Patent should read as corrected below.

Column 7, line 11, for "motor" read -- rotor --;

Signed and sealed this 3rd day of May 1960.

(SEAL)
Attest:

KARL H. AXLINE
Attesting Officer

ROBERT C. WATSON
Commissioner of Patents